United States Patent
Wada et al.

[11] Patent Number: 5,927,423
[45] Date of Patent: Jul. 27, 1999

[54] RECONFIGURABLE FOOTPRINT MECHANISM FOR OMNIDIRECTIONAL VEHICLES

[75] Inventors: Masayoshi Wada, Somerville; Haruhiko H. Asada, Concord, both of Mass.

[73] Assignee: Massachusetts Institute of Technology, Cambridge, Mass.

[21] Appl. No.: 09/035,626

[22] Filed: Mar. 5, 1998

Related U.S. Application Data

[60] Provisional application No. 60/039,983, Mar. 5, 1997.

[51] Int. Cl.$^6$ .................................................. B62D 61/12
[52] U.S. Cl. .......................................... 180/209; 180/907
[58] Field of Search ................................... 180/209, 907, 180/65.1

[56] References Cited

U.S. PATENT DOCUMENTS

| | | | |
|---|---|---|---|
| 3,306,390 | 2/1967 | Jamme | 180/209 |
| 3,685,853 | 8/1972 | Goldsmith | 280/81 R |
| 3,899,037 | 8/1975 | Yuker | 180/6.48 |
| 4,204,697 | 5/1980 | Santerre | 280/80 B |
| 4,353,428 | 10/1982 | Kovar et al. | 180/7 R |
| 4,558,758 | 12/1985 | Littman et al. | 180/8.1 |
| 4,694,923 | 9/1987 | Grenzicki | 180/209 X |
| 4,875,697 | 10/1989 | Miller | 280/95.1 |
| 5,249,636 | 10/1993 | Kruse et al. | 180/907 X |
| 5,407,217 | 4/1995 | Lambert et al. | 280/10 |
| 5,582,501 | 12/1996 | Meyer | 414/491 |
| 5,752,710 | 5/1998 | Roberts | 180/907 X |

FOREIGN PATENT DOCUMENTS

| | | | |
|---|---|---|---|
| 0051072 | 10/1980 | European Pat. Off. | |
| 60033172 | 2/1985 | Japan | |
| 1303725 | 4/1987 | U.S.S.R. | 180/209 |
| 752953 | 7/1956 | United Kingdom | 180/209 |
| 2317862 | 4/1998 | United Kingdom | |

| | | |
|---|---|---|
| WO 89/03336 | 4/1989 | WIPO |
| WO 98/02122 | 1/1998 | WIPO |

OTHER PUBLICATIONS

Jan. 1992, A Unified Transportation/Manipulation System with Holonomic Omnidirectional Vehicles for Flexible Conveyor–Less Manufacturing, Proceedings of the Japan U.S.A. Symposium on Flexible Automation, Editor: Ming Leu, Book No.: 10338B–1992.

Jan. 1994, Design of Ball Wheel Vehicles with Full Mobility, Invariant Kinematics and Dynamics and Anti–Slip Control DE–vol. 72, Robotics: Kinematics, Dynamics and Controls Editors: G.R. Pennock, J. Angeles, E.F. Fichter, R.A. Freeman, H. Lipkin, B.S. Thompson, J. Wiederrich, and G.L. Wiens Book No. H00918–1994.

May 1992, Design of a Holonomic Omnidirectional Vehicle, Proceedings of the 1992 IEEE Int. Conf. on Robotics and Automation.

May 1995, Design and Control of Ball Wheel Omnidirectional Vehicles by Mark West and Haruhiko Asada, 1995 IEEE Int. Conf. on Robotics and Automation, pp. 1931–38.

*Primary Examiner*—Christopher P. Ellis
*Attorney, Agent, or Firm*—Bromberg & Sunstein LLP

[57] ABSTRACT

A reconfigurable mechanism for varying the footprint of a wheeled omnidirectional vehicle. The variable footprint mechanism consists of a pair of beams intersecting at a pivotal point in the middle. Two pairs of ball wheels at the diagonal positions of the vehicle chassis are mounted, respectively, on the two beams intersecting in the middle. The angle between the two beams varies actively so that the ratio of the wheel base to the tread may change. Independent servomotors driving the ball wheels allow the vehicle to move in an arbitrary direction from an arbitrary configuration as well as to change the angle between the two beams and thereby change the footprint. By controlling the beam angle, static stability may be augmented, the width of the vehicle may be reduced, and the effective transmission ratio relating the vehicle speed to individual actuator speeds may be varied in a continuous manner.

27 Claims, 11 Drawing Sheets

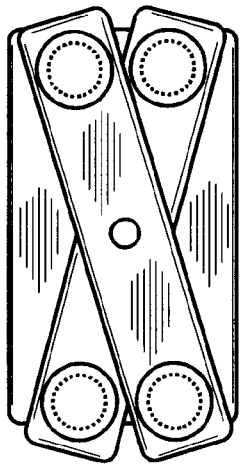
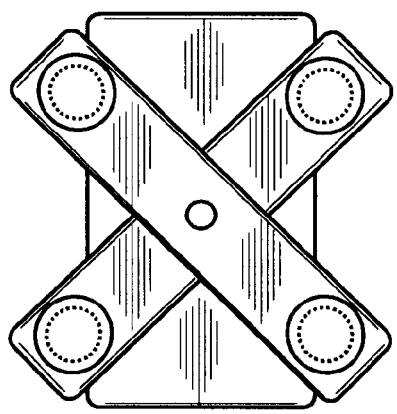
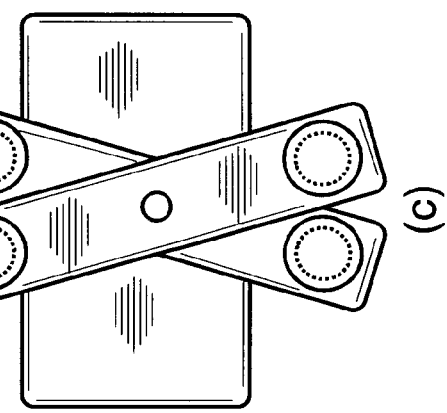
FIG. 2

(a) FIXED BEAM ANGLE ($\phi$ =45 DEG)

RECONFIGURABLE FOOTPRINT MECHANISM FOR OMNIDIRECTIONAL VEHICLES

The present application claims priority from U.S. provisional application No. 060/039,983, filed on Mar. 5, 1997, which is herein incorporated by reference.

FIELD OF THE INVENTION

The invention relates to a vehicle design featuring a spatially reconfigurable footprint comprising a changeable pattern of wheel positions providing enhanced stability and maneuverability to vehicles.

BACKGROUND ART

Stability is among the most fundamental requirements in vehicle design. The footprint of a vehicle must be large enough to prevent significant imbalance and avoid tipping. In particular, personal vehicles such as wheelchairs must be properly designed to prevent the user from falling out of the chair. A sufficient stability margin must be maintained despite shifts in the mass centroid of a patient's body. Patients who are unable to sit up in the middle of the chair tend to lean on the arm rests, shifting the body centroid sideways. When transferring to and from the wheelchair, patients must often undergo unstable transitions, which may cause the wheelchair to fall.

Most vehicles and, therefore, their footprints must conform to dimensional constraints. In particular, for wheelchairs in residential use, vehicle width, sometimes referred to as the tread, must be narrower than the standard doorway. All commercially available wheelchairs are restricted to this doorway dimension which is only 700 mm.

Vehicles designed for improved maneuverability improvement sometimes sacrifice stability and safety. For such designs, the footprint size will be minimized since a large footprint degrades precise movements especially within a closely confined place. This is a particular problem with residential wheelchairs in rooms such as bathrooms. Traditional vehicle designs based on fixed footprints are inefficient in solving the stability-maneuverability trade-off problem.

A holonomic vehicle does not need to change the direction of its wheels to change its direction of motion or rotation. The term "holonomic" means capable of arbitrary motion in an arbitrary direction on a planar surface from an arbitrary initial position and configuration. An omnidirectional personal vehicle using aspects of this design is described in a pending U.S. patent application filed on Apr. 21, 1997 with Ser. No. 08/840,522. This application as well as the associated references cited within this application are herein incorporated by reference. The vehicle has at least three ball wheels, each controlled by an independent motor or actuator, each ball wheel generating a traction force in a different direction in the plane of the surface over which the vehicle moves. The resultant force acting on the vehicle is given by the vectorial sum of the traction forces. Varying the combination of the traction forces creates a specified motion of the vehicle. There is no singular point in this system, hence it is omnidirectional and holonomic. Moreover, this ball wheel vehicle allows for smooth motion with no shimmy and jerk, all of which are particularly desirable in wheelchairs used for transporting patients.

Unlike traditional nonholonomic vehicles, a holonomic vehicle can move in an arbitrary direction including sideways and/or rotate without changing the direction of the wheels. Therefore applications of holonomic vehicles include wheelchairs, which need to maneuver in crowded locations such as residential homes, hospitals and long-term care units as well as factories.

Holonomic vehicles employ special kinds of wheels including wheels having free rollers disposed about the main wheels. Any wheel capable of providing holonomic motion, alone or in appropriate combination with other wheels of the same or other type, will be referred to herein and in any appended claims as a "wheel providing holonomic motion." Some wheels providing holonomic motion generate horizontal vibrations which might be a significant problem in a wheelchair application. An omnidirectional vehicle described in copending U.S. application Ser. No. 08/840,522 uses spherical tires held by a novel ring roller mechanism that transmits an actuator torque to the ball wheel.

A wheelchair used in a complex indoor environment should meet several requirements. First, it is desirable that the vehicle body be compact enough to go through arrow doorways. Residential doors are limited in width; the vehicle's tread and chassis width must confirm to the dimensional constraints. The footprint of the wheelchair must be wide enough to prevent the patient from falling on the floor despite shift in the mass centroid of the patient body. A large footprint is therefore desirable for stability and safety, while wheelchairs must conform to dimensional constraints. Stability and maneuverability are therefore conflicting requirements. Traditional vehicle designs based on fixed footprint are inefficient in solving the stability-maneuverability trade-off problem.

Additionally, a four-wheeled vehicle is desirable to maintain static stability of the vehicle, but incurs the over constraint problem between the wheels and the ground because three degree-of-freedom (DOF) motion of the vehicle is controlled by four independent motors. The over constraint problem may result in slip at the wheels or generate unwanted internal forces within the vehicle chassis.

SUMMARY OF THE INVENTION

The invention provides a surface contacting wheel assembly and a resultant vehicle which is afforded enhanced stability and maneuverability. The wheel assembly features a plurality of wheels having a spatial relationship which is reconfigurable before and during assembly motion. The configuration of points of contact of the wheels with a surface are changed based upon specific inputs to a vehicle controller. The inputs may come from a user or be derived from sensor measurements.

A specific embodiment provides that the wheel assembly is comprised of a support, members coupled to the support, wheels coupled to the members, and at least one sensor for measuring quantities characterizing the orientation of the members, assembly motion, and forces acting on the assembly. The members may move about an axis substantially perpendicular to the surface. Some or all of the wheels are coupled to provide holonomic motion, as defined below. A preferred embodiment provides that the members are a pair of beams configured so that each beam may rotate about a common axis located substantially at the midpoint between the ends of the beams. A beam angle is defined which when varied changes the wheelbase and tread, as defined below. This facilitates changing vehicle stability and maneuverability given the desired trajectory and mission. In addition, for an omnidirectional, holonomic vehicle, a continuous change in beam angle corresponds with a continuous change in transmission ratio, as defined below. In another embodiment, a pair of beams is oriented in parallel separated by a specified distance. The beams may be moved to change that distance.

A preferred embodiment provides that a vehicle for locomotion over a surface comprises the elements of the wheel assembly, as above, plus an input for receiving movement specification from a user, at least one wheel actuator, and a controller. The support may include a chair for bearing a human subject. Another embodiment provides for actuators to drive members as well as those to drive wheels.

In another aspect of the invention, in accordance with a preferred embodiment, a method is provided for preventing a vehicle, as described above, from tipping over while stationary. The method provides for sensing forces on each wheel, calculating the mass centroid of the vehicle, and reconfiguring the footprint to increase the margin of stability of the vehicle. In another embodiment, vehicle maneuverability may be improved by reconfiguring the footprint of the vehicle. In yet another embodiment, vehicle efficiency can be improved through change of the transmission ratio. The method comprises sensing a current footprint configuration and moving the wheels to change the footprint.

BRIEF DESCRIPTION OF THE DRAWINGS

FIGS. 2A, 2B, and 2C show, sequentially, how the reconfigurable footprint changes from minimum to maximum sidewise stability according to one embodiment of the invention.

DESCRIPTION OF SPECIFIC EMBODIMENTS

In accordance with a preferred embodiment of the present invention, a novel reconfigurable footprint mechanism is described which may augment the stability and enhance the maneuverability of a vehicle, such as a wheelchair, for example, and may additionally resolve the over-constraint problem discussed above. Furthermore, the varying footprint mechanism, as discussed herein, may function as a continuously varying transmission (CVT) in that the ratio between the actuator speed and the resultant vehicle speed, defined below as the "gear ratio," may be changed in a continuous manner. Therefore, the vehicle may concurrently meet diverse requirements for speed and torque, while exhibiting enhanced maneuverability and efficiency.

Figure 1:
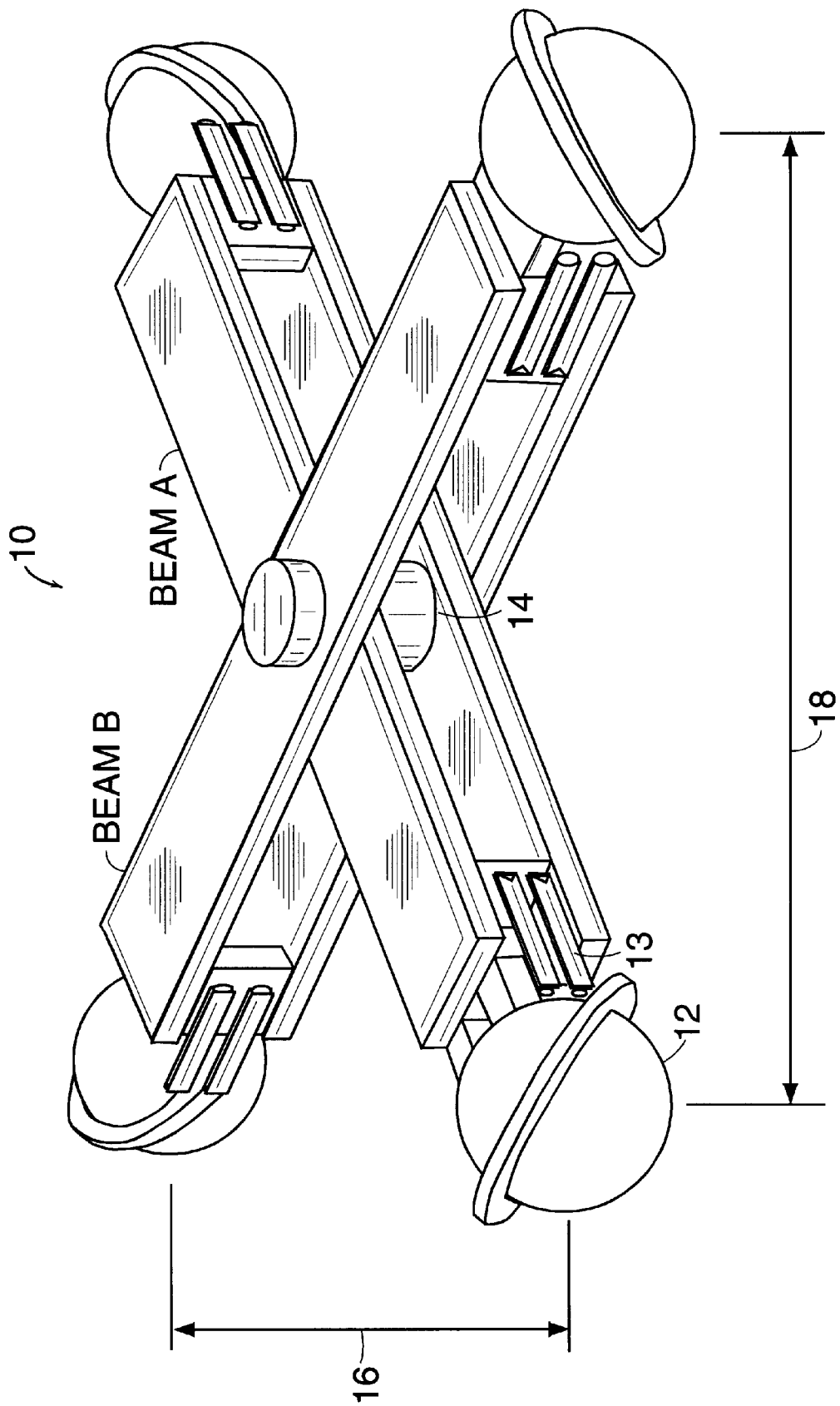
FIG. 1 is a perspective view of the assembled beam members and wheels of a reconfigurable footprint assembly for a vehicle according to a preferred embodiment of the present invention.

Referring to FIG. 1, a reconfigurable footprint assembly, designated generally by numeral 10, is shown in accordance with a preferred embodiment of the invention. Reconfigurable footprint mechanism may be used in conjunction with a holonomic omnidirectional vehicle as described below. In a preferred embodiment of the invention, wheels 12 have independent suspensions 13. While the reconfigurable footprint assembly may have any number of wheels, four wheels are preferred, and the wheels are preferably ball wheels as have been described. Distance 16 between the centers of mass of two ball wheels in one direction, corresponding to a fore-aft direction of a vehicle to which assembly 10 may be applied, may be referred to as the wheel base of the assembly. Similarly, distance 18 between the centers of mass of two ball wheels in the perpendicular direction, corresponding to a lateral direction of a vehicle to which assembly 10 may be applied, may be referred to as the tread of the assembly. Two pairs of the ball wheels at the diagonal positions are mounted at the tips of two beams A and B. Beams intersect A and B at a pivotal joint 14 in the middle of each of the respective beams, and the beams are each freely rotatable about joint 14, independently of each other, so that the ratio of the wheel base 16 to the tread 18 can vary. Joint 14 is coupled to a support structure (not shown) such that beams A and B rotate about an axis with respect to the support, where the axis is perpendicular to the surface, such as the ground, over which assembly 10 is traversing. In a typical configuration, beams A and B are of substantially equal length.

To go through a narrow doorway, the tread becomes narrow while the wheelbase becomes long, as shown in FIG. 2A with reference to the forward direction designated by arrow 20. To increase the sideways stability, the tread is expanded, as shown in FIG. 2C. To be isotropic, the two beams intersect at the right angle, as shown in FIG. 2B.

Figure 3:
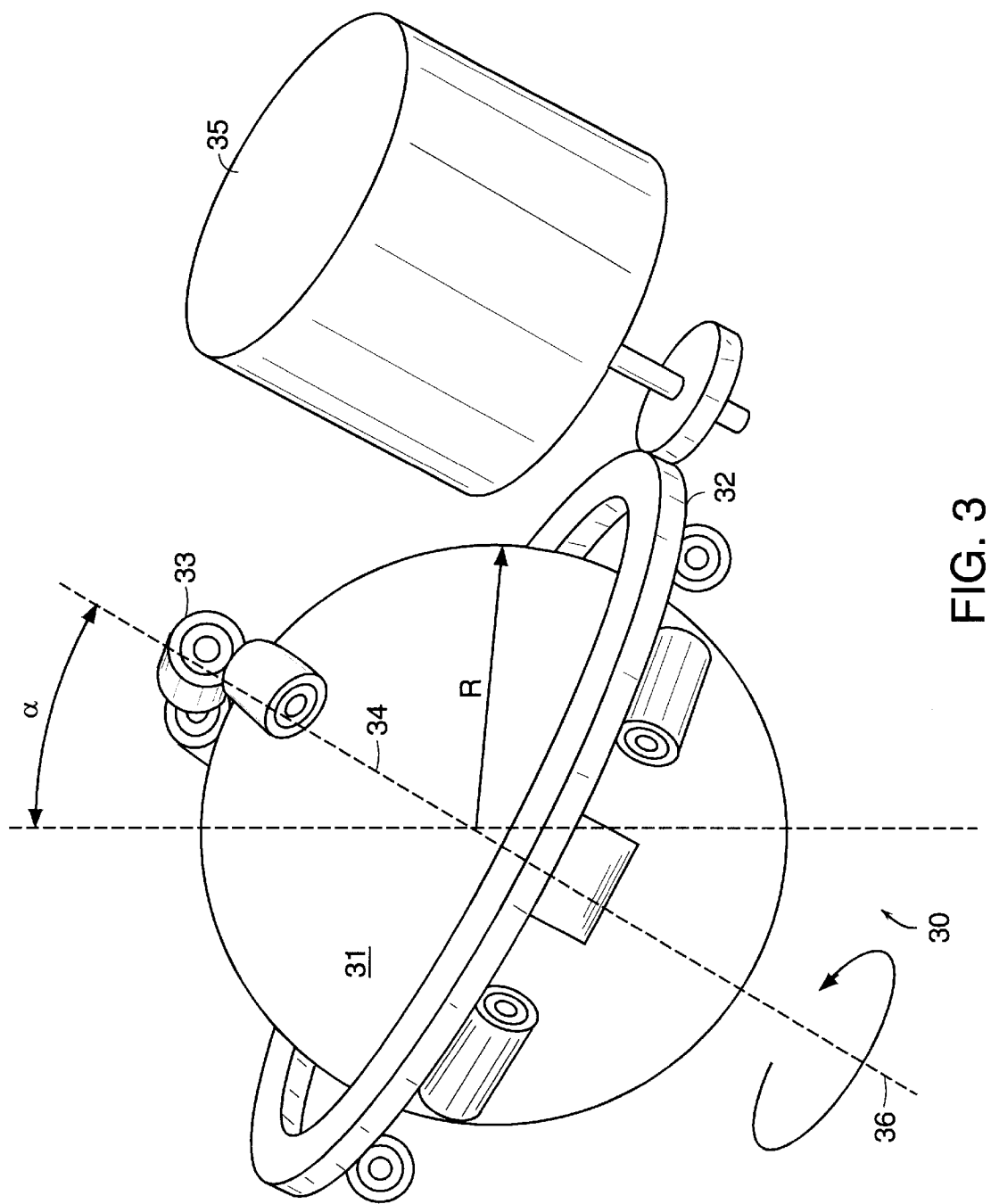
FIG. 3 is a perspective view of a ball wheel assembly which may be used in the present invention.

Referring now to FIG. 3, a perspective view is shown of a Ball wheel unit, designated generally by numeral 30, for providing holonomic motion, such a ball wheel unit being used for a holonomic vehicle in accordance with a preferred embodiment of the invention. Ball wheel 30 is one example of a wheel permitting holonomic motion of a vehicle. Other wheels providing holonomic motion are within the scope of the invention as claimed in the appended claims. A ball 31 is held by the ring roller 32 at a great circle of ball 31 together with a set of bearings 33 arranged on another great circle 34. A servo motor 35 is located by the ring roller 32 and drives the ball wheel 31 via the ring roller 32. Since the axis 36 of the ring is inclined, a traction force is created between the ball wheel and the floor. The chassis mounted bearings 33 allow passive rotation of the ball in the direction perpendicular to the one of traction force.

Figure 4:
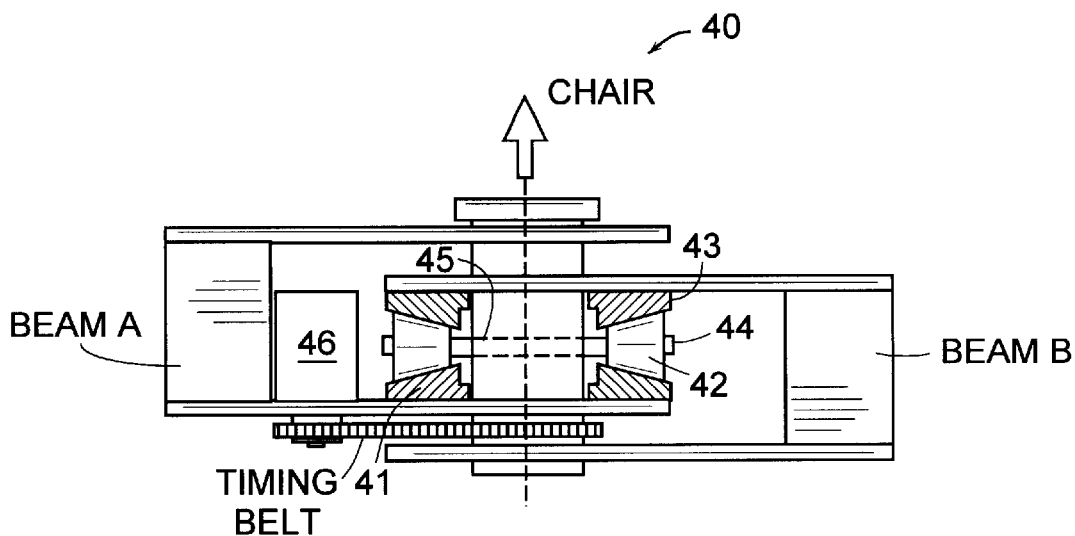
FIG. 4 is a longitudinal section of the pivotal joint for a vehicle according to one embodiment of the present invention.

In order for a chair mounted on the support of the reconfigurable footprint assembly to remain facing in a forward direction, it may be kept aligned with the bisector of the two beams intersecting at the pivotal joint, although both beams rotate about the joint. To this end, a differential gear mechanism, as shown in FIG. 4 and designated generally by numeral 40, is used for the pivotal joint. Referring to FIG. 4, the three bevel gears, 41, 42, and 43 form a differential gear mechanism. The middle bevel gear 43 rotates freely about the horizontal shaft 44, which is fixed to the vertical shaft 45. Bevel gear 41 is fixed to beam A, while bevel gear 42 is fixed to beam B. When beam A rotates about the vertical shaft 45 together with bevel gear 41, bevel gear 43 rotates. As a result, bevel gear 42 rotates the same amount but in the opposite direction to bevel gear 41. In consequence, the chair mounted on the vertical shaft 45 is kept at the bisector position of the intersecting beams, A and B. The angle between the two beams, which is herein referred to equivalently as the "beam angle," "cross-beam angle," "joint angle," or "pivot joint angle," is measured by a potentiometer 46 or other sensor.

In accordance with a preferred embodiment of the invention, the configuration of the beams supporting the wheels may be modified through separate control of the ball wheels of the vehicle.

The kinematics of the vehicle are now described with reference to an embodiment of the vehicle in which the ball wheels are attached near the ends of the rotatable beams, as depicted in FIG. 1. It is to be understood that the beams may be otherwise configure within the scope of the invention. In particular, the beams may be separately rotatable about separate axes of rotation, and the rotation is not restricted rotation about the centers of the beams.

In the following discussion, the relationship between the active ball wheel movements driven by individual and the resultant vehicle motion are obtained. This allows processor control in order to actuate the individual wheels and thereby to control both the configuration and motion of the vehicle. It is to be noted that other control strategies may be employed. For example, the pivot angle between the beams may be separately controlled by a motor. In that case, only three wheels need by actively driven in order to provide the requisite control over four degrees of freedom.

Figure 5:
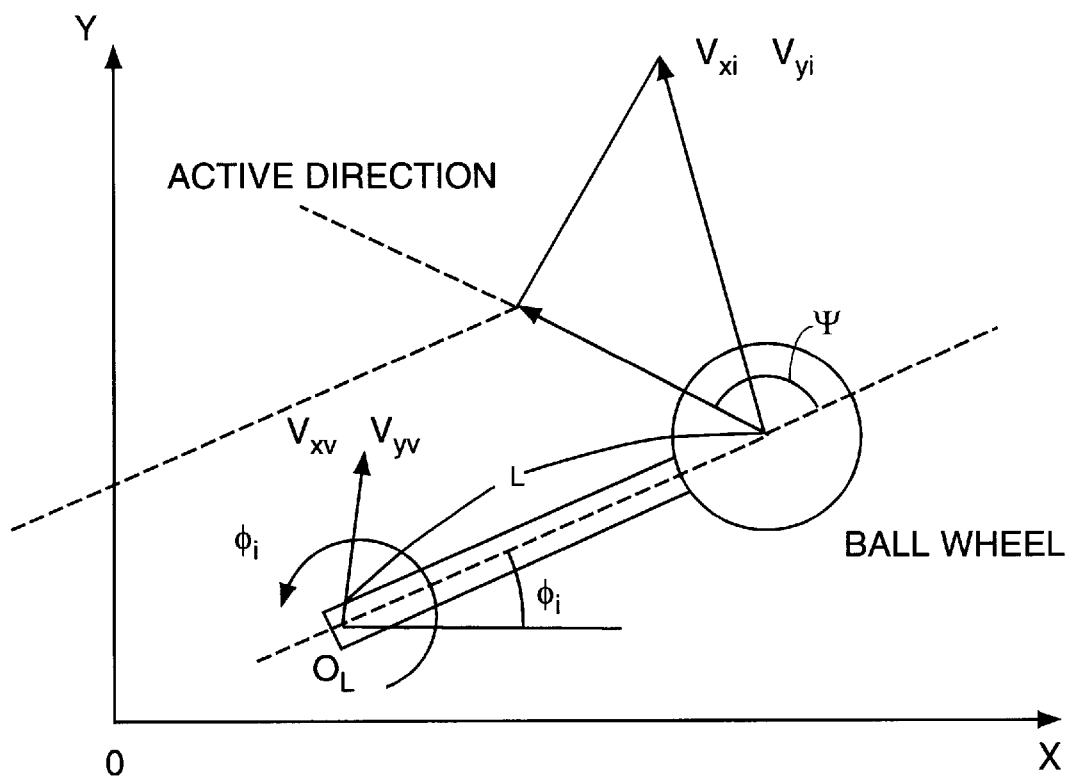
FIG. 5 depicts a generalized coordinate system for a ball wheel employed in accordance with embodiments of the invention.

Referring now to the coordinate frame of the i-th ball wheel, as depicted in FIG. 5, where the i-th ball wheel and half the beam holding the ball wheel are shown. As the ball rolls on the floor, i.e. the X-Y plane, the contact point with the X-Y plane moves together with the beam. The time rate of change of the contact point is expressed in terms of ball velocities, $v_{xi}$ and $v_{yi}$ with reference to the fixed frame O-XY. The pivotal joint of the vehicle, denoted $O_v$ in the figure, moves at $v_{xv}$ and $v_{yv}$ and the angular velocity of the i-th half beam is denoted $\dot\phi$. The ball velocities, $v_{xi}$ and $v_{yi}$, are given by $$\begin{bmatrix} v_{xi} \\ v_{yi} \end{bmatrix} = \begin{bmatrix} 1 & 0 & -L\sin\phi_i \\ 0 & 1 & L\cos\phi_i \end{bmatrix} \begin{bmatrix} v_{xv} \\ v_{yv} \\ \dot\phi_i \end{bmatrix}$$

where L is the distance between the pivotal joint $O_v$ and the contact point of the ball wheel. The ball wheel rolls in one direction, and is free to roll in the direction perpendicular to the active direction, as mentioned previously. Let $\psi$ be the angle pointing in the direction of active rolling on the O-XY plane, as shown in FIG. 5. Note that $\psi$ is measured relative to the beam to which the ball wheel mechanism is fixed. The ball velocities, $v_{xi}$ and $v_{yi}$, can be decomposed into the velocity in the active direction, $v_{ai}$, and the one in the passive direction. From the preceding equation, the active velocity component $v_{ai}$ is given by $$v_{ai}=v_{xi}\cos(\phi_i+\psi)+v_{yi}\sin(\phi_i+\psi)=v_{xv}\cos(\phi_i+\psi)+v_{yv}\sin(\psi_i+\psi)+\dot\phi_i L\sin\psi_i.$$

The i-th active velocity component $v_{ai}$ is directly related to the angular velocity of the i-th actuator $\omega_i$. As shown in FIG. 3, R is the radius of the spherical tire and $\alpha$ is the angle between the vertical line and the direction of the inclined roller ring. The active velocity $v_{ai}$ is given by $$v_{ai}=\rho R\sin\alpha\cdot\omega_i,$$

where $\rho$ is the gear reduction ratio associated with the roller ring and the gear of the motor.

Figure 6:
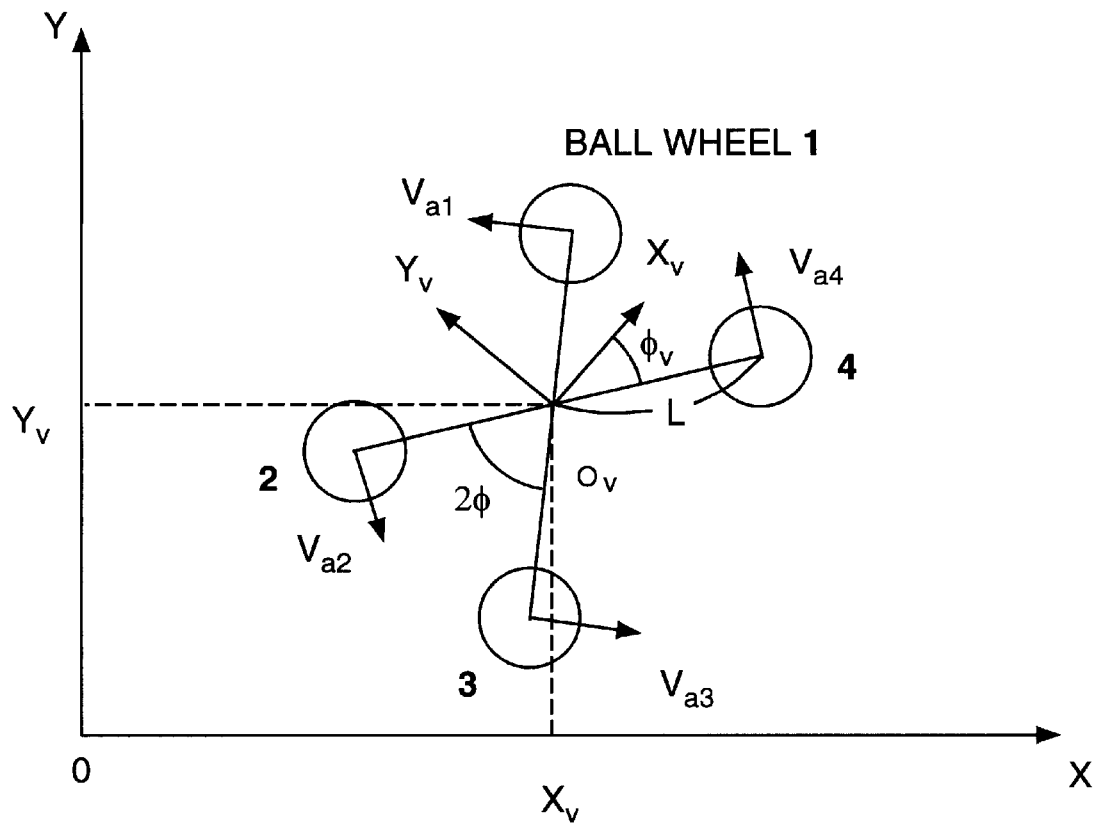
FIG. 6 depicts a generalized coordinate system for vehicles in accordance with specific embodiments of the invention.

Referring now to FIG. 6, a coordinate frame for characterizing the entire vehicle with four ball wheels and two mutually bisecting beams is shown. Frame $O_v$-$X_v Y_v$ is attached to the pivotal joint, where the $X_v$ axis is the bisector of the angle between the two beams, $2\phi$. Letting $\phi_v$ be the angle of the $X_v$ axis measured from the X axis, the direction of each half beam is given by $$\phi_1 = \phi_v + \phi, \qquad \phi_2 = \phi_v - \phi + \pi$$
$$\phi_3 = \phi_v + \phi + \pi, \qquad \phi_4 = \phi_v - \phi.$$

To completely describe the vehicle motion including the variable footprint mechanism, four generalized velocities are needed; translational velocities of the pivotal joint, $v_{xv}$, and $v_{yv}$, the angular velocity of the vehicle chassis, $\dot\phi_v$, and the time rate of change of the angle between the two beams, $\dot\phi$. The following matrix is obtained relating the active wheel velocities to the four vehicle generalized velocities:

$$\begin{bmatrix} v_{a1} \\ v_{a2} \\ v_{a3} \\ v_{a4} \end{bmatrix} = \begin{bmatrix} \cos(\phi+\psi) & \sin(\phi+\psi) & L\sin\psi & L\sin\psi \\ \cos(\phi+\psi) & -\sin(\phi+\psi) & L\sin\psi & -L\sin\psi \\ -\cos(\phi+\psi) & -\sin(\phi+\psi) & L\sin\psi & L\sin\psi \\ -\cos(\phi+\psi) & \sin(\phi+\psi) & L\sin\psi & -L\sin\psi \end{bmatrix} \begin{bmatrix} v_{xv} \\ v_{yv} \\ \dot\phi_v \\ \dot\phi \end{bmatrix}$$

The above 4 by 4 matrix is invertible for all the vehicle configuration, as long as $\cos\phi\sin\phi\neq 0$. The inversion may be expressed as:

$$V_v = JV_a,$$

where $$v_v=[v_{xv},v_{yv},\dot\phi_v,\dot\phi]^T$$

$$v_a=[v_{a1},v_{a2},v_{a3},v_{a4}]^T$$

and $$J = \begin{bmatrix} \frac{1}{4\cos(\phi+\psi)} & \frac{1}{4\cos(\phi+\psi)} & \frac{-1}{4\cos(\phi+\psi)} & \frac{-1}{4\cos(\phi+\psi)} \\ \frac{1}{4\sin(\phi+\psi)} & \frac{-1}{4\sin(\phi+\psi)} & \frac{-1}{4\sin(\phi+\psi)} & \frac{1}{4\sin(\phi+\psi)} \\ \frac{1}{4L\sin\psi} & \frac{1}{4L\sin\psi} & \frac{1}{4L\sin\psi} & \frac{1}{4L\sin\psi} \\ \frac{-1}{4L\sin\psi} & \frac{1}{4L\sin\psi} & \frac{1}{4L\sin\psi} & \frac{-1}{4L\sin\psi} \end{bmatrix}.$$

Note that matrix J is the Jacobian relating the vehicle velocity vector to the ball velocities in the active directions. The above analysis shows that the four independent actuators driving the four ball wheels completely determine the vehicle velocity as well as the angular velocity of the footprint reconfiguration mechanism. Note that there is no singular point in the Jacobian and that no over-constraint situation occurs for this mechanism.

Static Stability Augmentation

Static stability is the most critical requirement for wheelchairs. The varying footprint mechanism may be used for augmenting the vehicle stability. An objective of static stability augmentation is to keep the position of the mass centroid within the footprint of the platform by varying the joint angle between the two beams.

Figure 7:
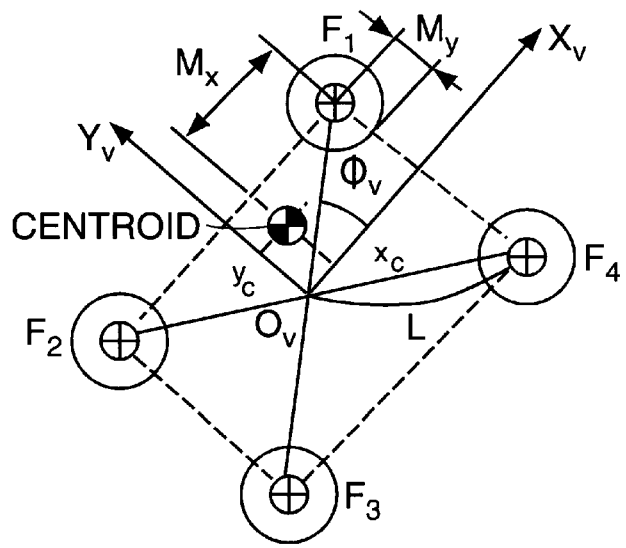
FIG. 7 graphically illustrates the concept of static stability margin within the confines of an embodiment of the invention.

Referring to FIG. 7, a method for estimating the position of the centroid and obtaining the optimal joint angle that maximizes static stability margin of the platform is presented. Let m be the mass of the total load, i.e. the mass of the chair, patient, and vehicle excluding the ball wheels. Let $(x_c, y_c)$ be the coordinate of the mass centroid with respect to the vehicle coordinate frame. Each ball wheel is equipped with a load cell to monitor the load distribution. Appropriate force sensors are well-known in the art.

Let Fi be the vertical force acting on the i-th ball, then the mass centroid position is given by $$x_c = \frac{L}{mg} F_x \cos\phi, \quad y_c = \frac{L}{mg} F_y \sin\phi$$

where $$F_x = F_1 - F_2 - F_3 + F_4$$

$$F_y = F_1 + F_2 - F_3 - F_4$$

Static stability margin is defined to be the minimum distance from the mass centroid position to the footprint boundary. Let Mx and My be the shorter distances to the sides in the x and y directions, respectively. As shown in the figure, static stability margin M is given by $$M = Min(M_x, M_y)$$

where $$M_x = L\cos\phi - |x_c|, \quad M_y = L\sin\phi - |y_c|.$$

The optimal footprint configuration is then given by the pivotal joint angle that maximizes the static stability margin given above:

$$\phi^0 = \arg\max_{0<\phi<\frac{\pi}{2}} (Min(M_x, M_y)).$$

Figure 8:
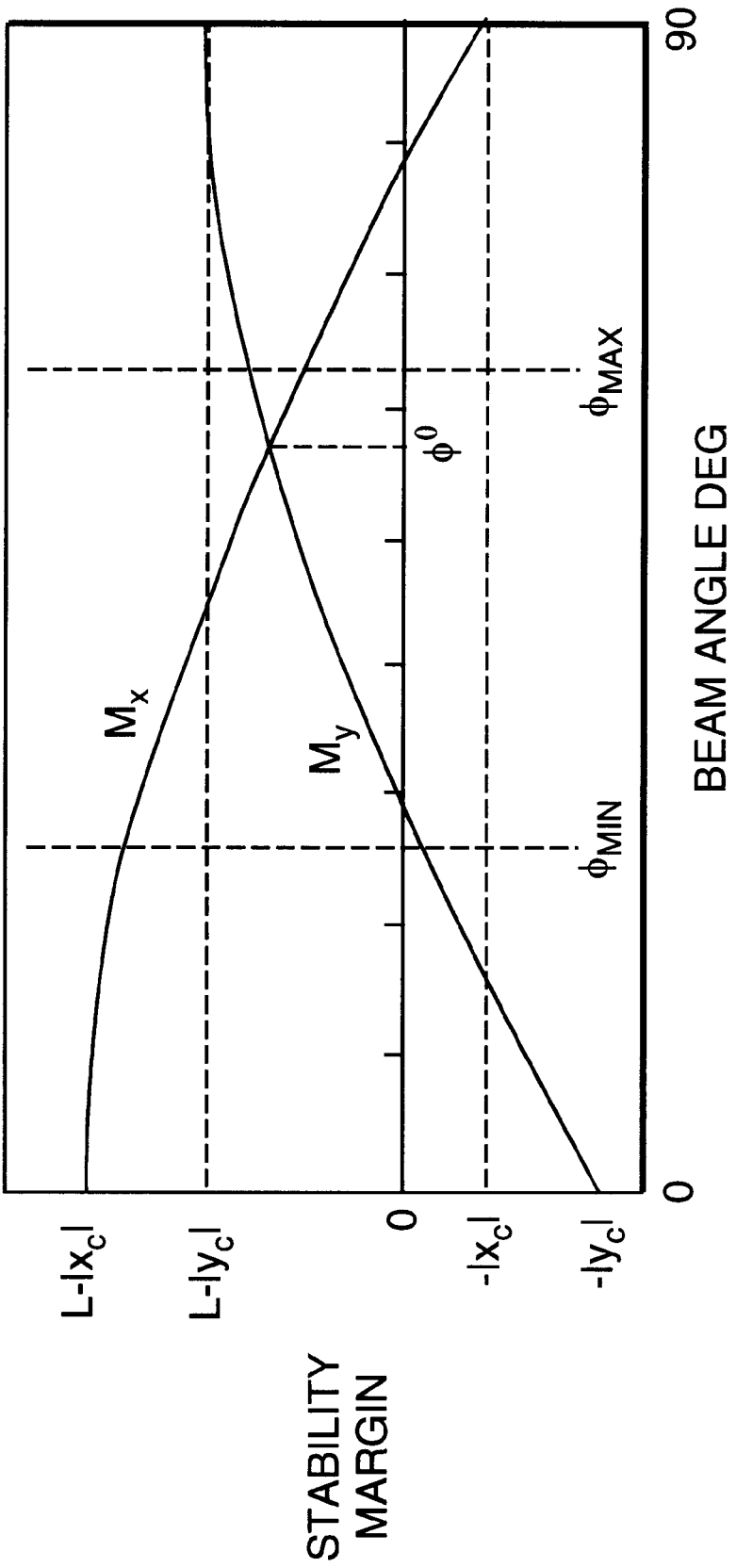
FIG. 8 shows plots of $M_x$ and $M_y$ as functions of $\phi$ and a method of deriving the optimal joint angle $\phi^0$ according to an embodiment of the invention.

This is a type of max-min strategy, which best augments the stability in the worst direction. Referring to FIG. 8, a plot is shown of $M_x$ and $M_y$ as functions of $\phi$. The optimal joint angle, $\phi^0$ is given by the intersection of the two curves, which may be expressed as:

$$\phi^0 = \tan^{-1}\frac{Min\{(F_1+F_4),(F_2+F_3)\}}{Min\{(F_1+F_2),(F_3+F_4)\}}.$$

Note that in accordance with this embodiment of the invention, patient weight, vehicle weight, and the absolute value of each ball wheel load are not required, but only the ratio of the wheel load distribution is applied.

Transmission Control

As indicated by the Jacobian given above, the vehicle velocity varies depending on the pivot angle $\phi$ while the speeds of the four actuators remain the same. This implies that the varying footprint configuration would change the kind of transmission ratio between the actuators and the vehicle. Depending on requirements for vehicle speed and traction force, a transmission ratio may be chosen by varying the footprint of the vehicle, i.e., pivot angle $\phi$.

Considering the translational part of vehicle motion alone, the translational vehicle velocity $v_t = [v_{xv}, v_{yv}]^T$ is related to the ball wheel velocity vector $v_a$ by $$V_t = J_t V_a$$

where $J_t$ consists of the first two rows of Jacobian J.

$$J_t = \frac{1}{4}\begin{bmatrix} \frac{-1}{\sin\phi} & \frac{-1}{\sin\phi} & \frac{1}{\sin\phi} & \frac{1}{\sin\phi} \\ \frac{1}{\cos\phi} & \frac{-1}{\cos\phi} & \frac{-1}{\cos\phi} & \frac{1}{\cos\phi} \end{bmatrix}.$$

The transmission ratio of the vehicle drive system is defined as $$\lambda = \frac{|V_t|}{|V_a|},$$

where |x| represents the norm of vector x.

Note that, since the vehicle is a multi degree-of-freedom system, the standard scalar quotient, i.e. $v_t/v_a$, cannot be used. The transmission ratio varies depending on the direction of the vehicle motion. The maximum and minimum of $\lambda$ and their direction of motion are given by using the singular value decomposition of Jacobian $J_t$.

$$J_t = [u_1 \quad u_2]^T \begin{bmatrix} \frac{1}{2\sin\phi} & 0 & 0 & 0 \\ 0 & \frac{1}{2\cos\phi} & 0 & 0 \end{bmatrix} [v_1 \quad v_2 \quad v_3 \quad v_4],$$

where $1/\sin\phi$ and $1/\cos\phi$ are singular values of matrix $J_t$, which provides the maximum and minimum transmission ratios. Namely, for $0<\phi\leq\pi/4$, the transmission ratio takes the maximum, $\lambda\max=\frac{1}{2}\sin\phi$, when the vehicle moves in the direction of vector $u_1^T=[1, 0]$, i.e., the X axis, with the distribution of actuator speeds given by vector $v_1^T=[-1,-1,1,1]$, while the minimum, $\lambda\min=\frac{1}{2}\cos\phi$, takes place when the vehicle moves in $u_2^T=[0, 1]$, i.e., the Y-axis, with the actuator speed distribution of $v_2^T=[1,-1,-1,1,1]$. When the actuator speed distribution is $v_3$ or $v_4$, no translational velocity is generated.

Figure 9B:
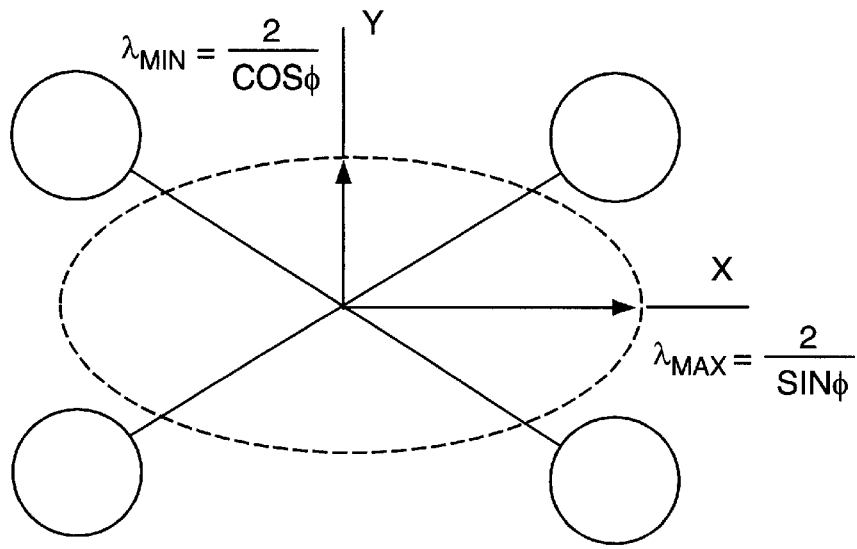
FIGS. 9A and B illustrate pictorially and graphically, respectively, the predicted values of the transmission ratio of the vehicle with respect to motion along each of two perpendicular directions according to a specific embodiment of the invention.
Figure 9A:
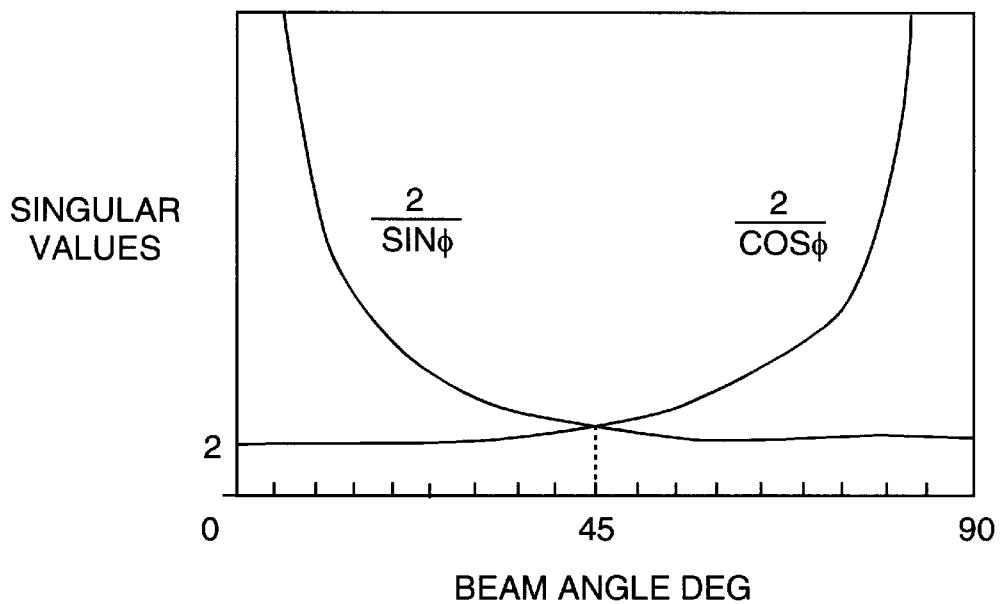
Figure 10:
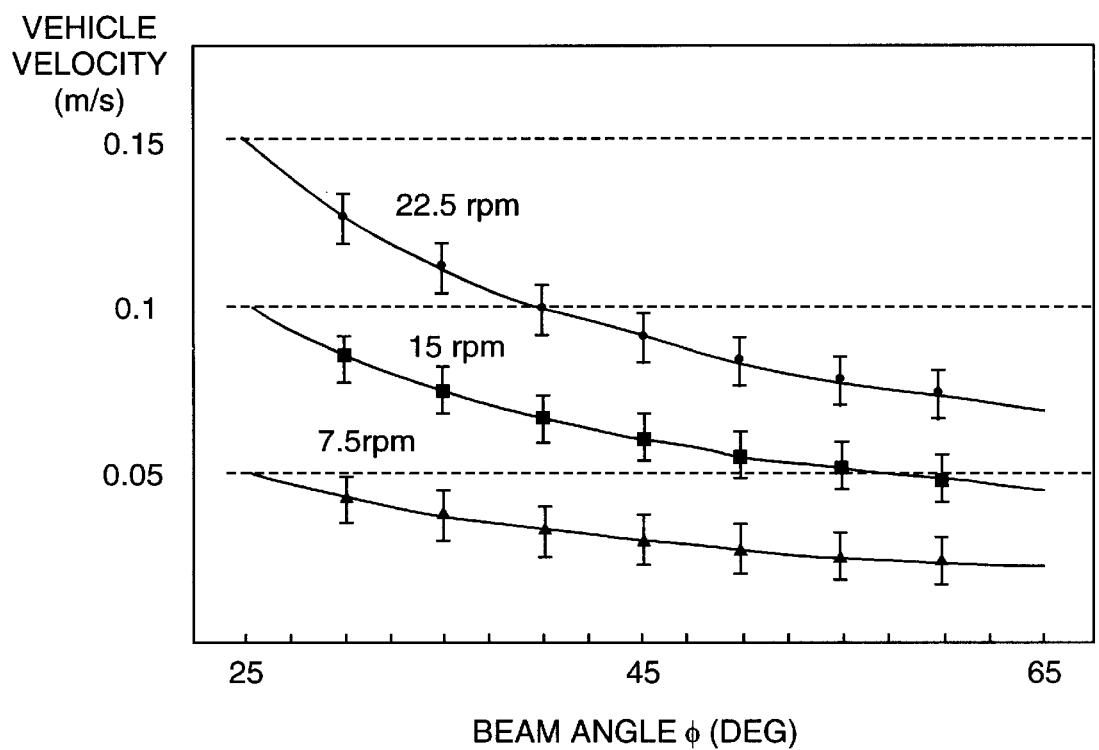
FIG. 10 depicts how the transmission ratio varies with the cross-beam angle in accordance with a specific embodiment of the invention.

FIG. 9A shows the directions of the maximum and minimum transmission ratios, and FIG. 9B shows the plot of the max/min transmission ratios against the pivot angle between the two beams, $\phi$. Note that the transmission ratio varies broadly and continuously as pivot angle $\phi$ varies. Therefore, the variable footprint mechanism can be used as a continuously variable transmission (CVT).

Note that at $\phi\_\_=\pi/4$, the vehicle has an isotropic transmission ratio of $\sqrt{2}/2$ in all directions. Note also that, as the transmission ratio becomes larger, the traction force generated becomes smaller, hence the acceleration of the vehicle becomes smaller. From the above analysis it follows that Pivot angle $\phi$ must be small in order to move at a high speed in the X-direction. For traveling a long distance at a high speed, the footprint should be long in the longitudinal direction.

For getting large traction force, the footprint should be narrow in that direction Multiple strategies may be used for determining the footprint configuration along with the stability augmentation scheme, in accordance with various embodiments of the present invention.

Subsumption Control Architecture

In accordance with embodiments of the invention, several kinds of tasks might be requested for the vehicle. These tasks are depend on not only the operator's requirements but also the current situation of the vehicle in terms of its local terrain and operating requirement. In order to coordinate these tasks, a subsumption control architecture for the system.

To implement the subsumption architecture, the vehicle behaviors have decomposed into four tasks (A–D) and each task has been analyzed as follows:

Task A is the a fundamental task in which the vehicle moves in any direction and/or rotates about any point as the operator requests while the vehicle stability is maintained. When the operator requests the vehicle to move by using a joystick, the vehicle moves in a given direction at a given velocity. At the same time, the footprint configuration is automatically controlled to maximize the stability margin based on the load distribution among the wheels. The vehicle motion control and the footprint configuration control are achieved simultaneously and independently by driving four wheels.

Task B achieves the efficient power driving for long distance traveling. When the operator commands the vehicle to move at high speed, the footprint configuration may be varied to change the transmission ratio of the wheel and the vehicle. The transmission ratio may be chosen to maintain the maximum margin of the traction force. During the task execution, maximum velocity of the translational sideways and rotational motion are restricted to avoid the vehicle to be unstable in sideways.

In task C, the vehicle achieves the control mode for going through narrow doorways or maneuvering in crowded areas. The vehicle has to minimize its width for going through doorways and minimize the diameter of the vehicle footprint for maneuvering in crowded areas. All vehicle motions should be restricted in slow speed. The task C is triggered and reset by the operator's command sent via buttons on the joystick.

In Task D, it is assumed that the vehicle may not be allowed to fall down. The static stability margin would be monitored and if the margin hits the minimum margin, then all vehicle motions are stopped and the footprint configuration is varied to maintain the limit stability margin. At the same time, a warning signal may be sent to the operator in order to make the operator or patient aware of the risk.

Figure 12:
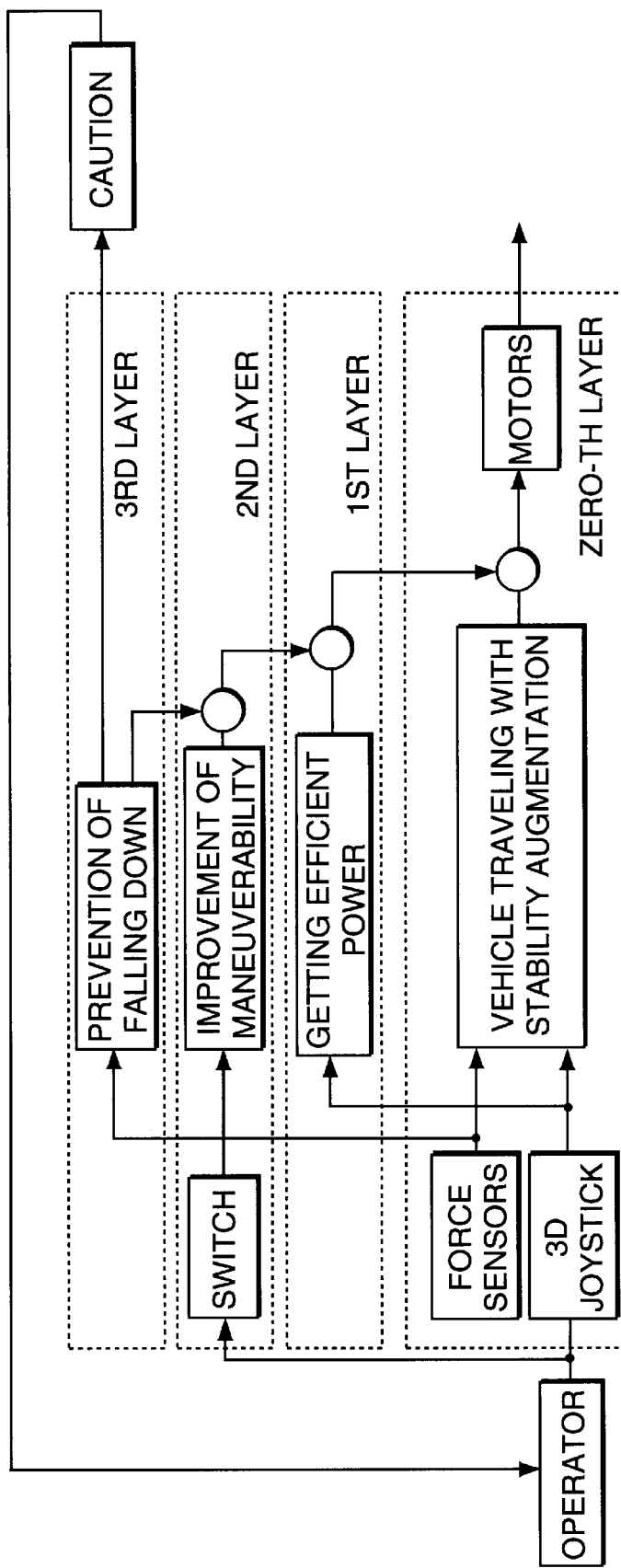
FIG. 12 is a schematic diagram of the vehicle control system for a vehicle with a reconfigurable wheelbase in accordance with an embodiment of the invention.

These tasks are assigned to four layers(zero-th to 3rd) of the subsumption architecture, respectively, as described now in reference to FIG. 12. The layer of large number has higher priority than that of smaller number, i.e., task A occupying the zero-th layer has the lowest priority, and task D occupying the 3rd layer has highest priority. Details of each task are described as follows.

(Task A (Zero-th Layer) : Vehicle Traveling with Static Stability Augmentation

A—0: Detect the changing of position of mass centroid.

A—1: Change the footprint shape so as to optimize the stability margin.

A—2: Move vehicle if the operator request the vehicle to move.

(Task B (1st Layer): Getting Efficient Power in a Higher Speed of the Vehicle

B—0: Detect the vehicle velocity exceeding the certain value.

B—1: Change the footprint shape to change the transmission ratio depending on the velocity of the vehicle.

B—2: Restrict the lateral velocity and rotational speed of the vehicle.

B—3: Monitor the velocity of the vehicle to be reduced below certain speed, then reset.

(Task C (2nd Layer): Improvement of Maneuverability [Going through doorways or moving around crowded areas]

C—0: Detect the command from a switch.

C—1: Change the footprint shape to minimize the width or rotational radius of the vehicle.

C—2: Slowdown the vehicle speed.

C—3: Detect the reset command from the switch, then reset.

(Task D (3rd Layer): Prevention of Falling Down

D—0: Detect the stability margin hitting the minimum limit.

D—1: Change the footprint shape to prevent the falling.

D—2: Stop the vehicle.

D—3: Give a caution to the operator by beeps.

D—4: Check the stability margin to be recovered, then reset.

The system has hierarchical configuration and may adapt to multiple situations or requirements by changing the layer taking the control.

Figure 11A:
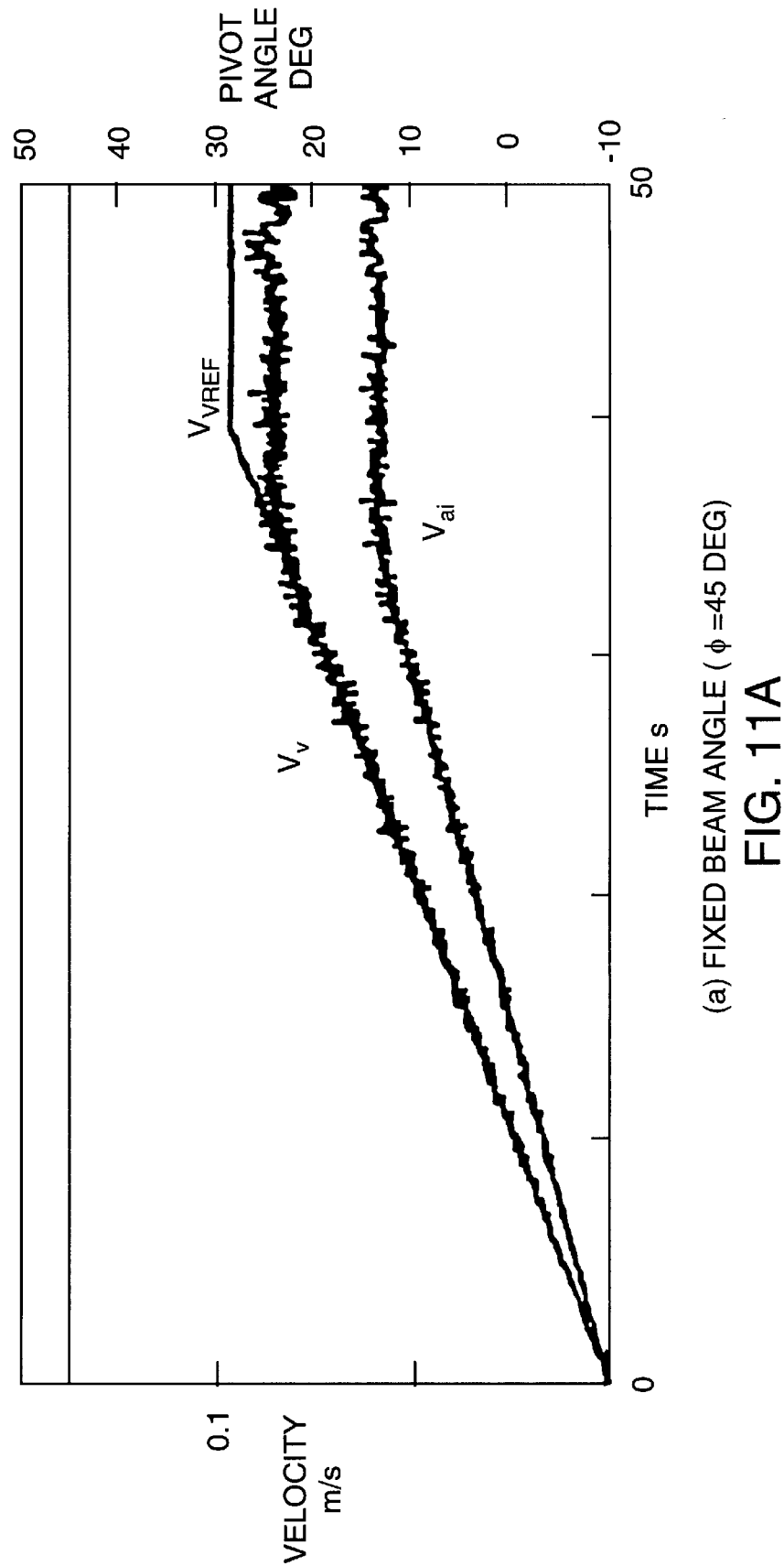
FIG. 11A shows plots of the vehicle velocity versus time under conditions of acceleration at fixed pivot angle.
Figure 11B:
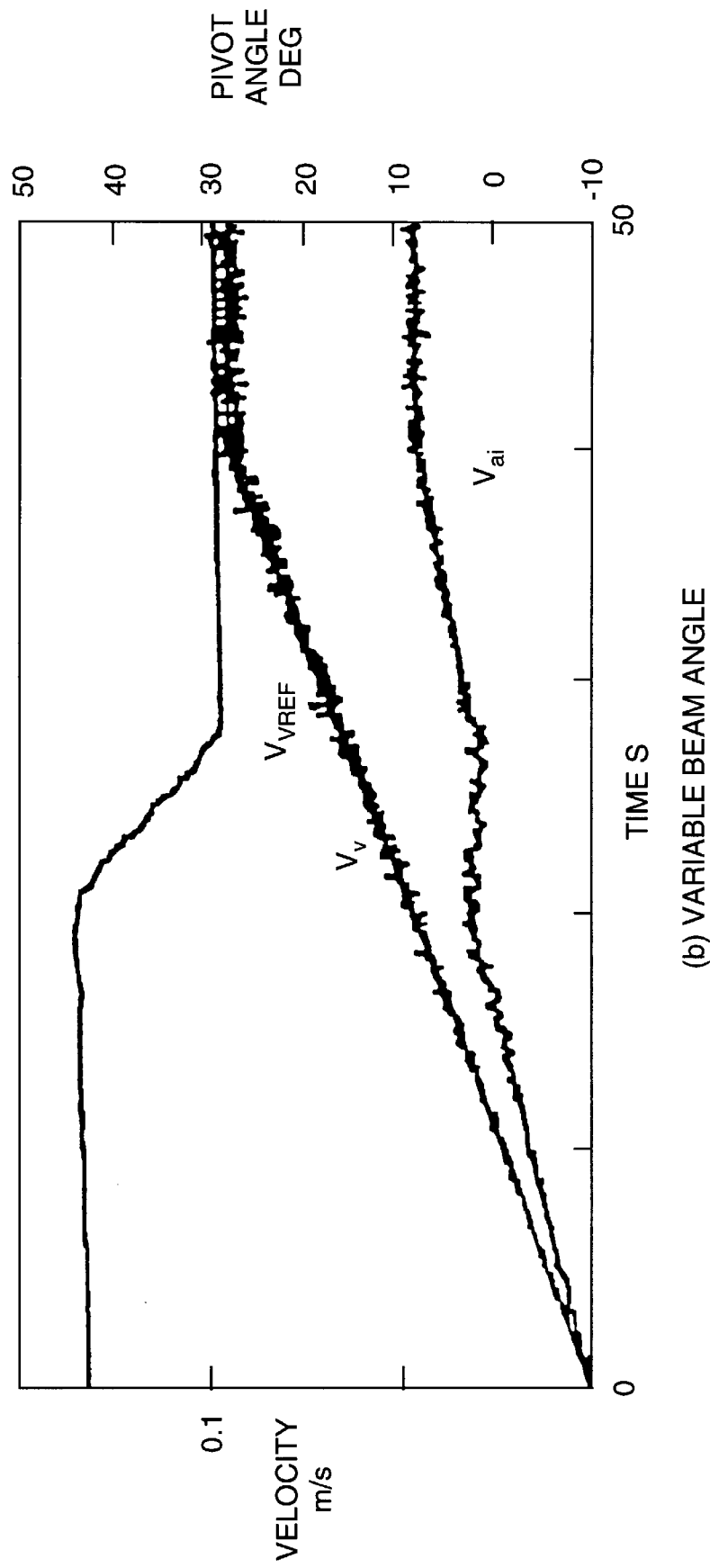
FIG. 11B shows plots of the operation of an embodiment of the invention when the pivot angle is varied by the variable transmission algorithm.

Operation of the vehicle demonstrates that since the direction of traction force of each wheel is changed by the relative angle between two beams, the ratio between the wheel velocity and the vehicle velocity is varied by footprint configuration. Thus, changing the beam angle acts as changing a type of transmission ratio of the vehicle. Referring, now, to FIGS. 11A and B, vehicle velocities are shown for different beam angles. It is apparent that the vehicle velocity varies depending on the beam angle while the ball wheel velocity remains the same. The experimental results are in accord with theoretical vehicle velocities indicated by solid lines calculated by the Jacobian described above. Thus, the wheel motors may be controlled on the basis of the Jacobian so as to keep a given vehicle velocity at an arbitrary footprint configuration.

While the invention has been described in detail, it is to be clearly understood that the same is by way of illustration and example and is not to be taken by way of limitation. Indeed, numerous variations and modifications will be apparent to those skilled in the art. All such variations and modifications are intended to be within the scope of the present invention as defined in the appended claims.

We claim:

1. A surface contacting wheel assembly, the assembly comprising:

a support;

a plurality of members coupled to the support and characterized by a configuration, each member moveable about a common axis fixed with respect to the support and substantially perpendicular to the surface;

a plurality of wheels, each wheel coupled to one of the members, each wheel having a center of mass, each wheel having at least one point of contact with the surface, the points of contact of the plurality of wheels having a specified spatial relationship such that the specified spatial relationship is reconfigurable, before and during motion of the assembly; and at least one sensor for measuring a physical quantity characterizing at least one of the configuration of the members, the motion of the wheel assembly, and the forces acting upon the wheel assembly.

2. A wheel assembly as in claim 1, wherein the plurality of members includes a pair of beams, each beam having two ends.

3. A wheel assembly as in claim 2, wherein the pair of beams are coupled to the support in such a manner that each beam may rotate about the common axis, the common axis located substantially at the midpoint between the ends of each beam, thereby defining a beam angle between the beams.

4. A wheel assembly as in claim 1, wherein at least three of the plurality of wheels are wheels providing holonomic motion.

5. A wheel assembly as in claim 3, wherein each of the at least three of the plurality of wheels is coupled substantially at one of the ends of the beams.

6. A wheel assembly as in claim 3, wherein each of the at least four of the plurality of wheels is coupled substantially at one of the ends of the beams.

7. A vehicle for locomotion over a surface under the control of a user, the vehicle comprising:

a support;

a plurality of members coupled to the support and characterized by a configuration, each member moveable about a common axis fixed with respect to the support and substantially perpendicular to the surface;

a plurality of wheels, each wheel coupled to one of the members, each wheel having a center of mass, each wheel having at least one point of contact with the surface, the points of contact of the plurality of wheels having a specified spatial relationship such that the specified spatial relationship is reconfigurable, before and during motion of the assembly; and at least one sensor for measuring a physical quantity characterizing at least one of the configuration of the members, the motion of the wheel assembly, and the forces acting upon the wheel assembly;

an input for receiving movement specification from a user;

at least one wheel actuator for driving at least one of the plurality of wheels; and a processor for controlling the at least one actuator on the basis of the movement specification from the user and from the measured physical quantity.

8. The vehicle of claim 7, wherein the support further includes a chair for bearing a human subject in a recumbent position.

9. The vehicle of claim 7, wherein at least three of the plurality of wheels are wheels providing holonomic motion.

10. The vehicle of claim 9, wherein the plurality of member includes a pair of beams, each beam having two ends.

11. The vehicle of claim 10, wherein the pair of beams are coupled to the support in such a manner that each beam may rotate about the common axis, the common located substantially at the midpoint between the ends of each beam, thereby defining a beam angle between the beams.

12. The vehicle of claim 11, wherein each of the at least three of the plurality of wheels are coupled substantially at one of the ends of the beams.

13. The vehicle of claim 12 wherein each of the at least four of the plurality of wheels is coupled substantially at one of the ends of the beams.

14. The vehicle of claim 9, further comprising at least one member actuator for driving at least one member.

15. The vehicle of claim 11, further comprising at least one member actuator for driving at least one member.

16. The vehicle of claim 15, wherein the at least one member actuator is capable of driving at least one beam about the axis substantially perpendicular to the surface.

17. The vehicle of claim 12, wherein each of the plurality of wheels is driven by at least one of the at least one wheel actuators.

18. The vehicle of claim 16, wherein each of the at least three wheels providing holonomic motion is driven by a distinct wheel actuator such that the vehicle is capable of a continuously varying vehicle speed transmission correlated with a continuously varying change in beam angle.

19. The vehicle of claim 7, wherein at least four of the plurality of wheels are wheels providing holonomic motion.

20. The vehicle of claim 19, wherein the plurality of members includes a pair of beams, each beam having two ends.

21. The vehicle of claim 20, wherein the pair of beams are coupled to the support in such a manner that each beam may rotate about the common axis, the common axis located substantially at the midpoint between the ends of each beam, thereby defining a beam angle between the beams.

22. The vehicle of claim 21, wherein each of the at least four of the plurality of wheels are coupled substantially at one of the ends of the beams.

23. The vehicle of claim 22, wherein each of the plurality of wheels is driven by at least one of the at least one wheel actuators.

24. The vehicle of claim 23, wherein each of the four wheels providing holonomic motion are driven by four distinct wheel actuators such that the vehicle is capable of a continuously varying vehicle speed transmission correlated with a continuously varying change in beam angle.

25. A method of preventing a vehicle from tipping over while stationary, the vehicle having a support, a plurality of members, a plurality of moveable wheels and a controller, each wheel coupled to a member, each member moveable about a common axis with respect to the support, the method comprising the following steps:

setting an initial vehicle footprint;

applying a load to the vehicle;

sensing instantaneous forces acting upon each of the plurality of wheels;

calculating the mass centroid of the vehicle;

moving the members about the common axis for reconfiguring the vehicle footprint such that a stability margin is optimized; and repeating the steps to account for time variable loads.

26. A method of improving the maneuverability of a vehicle, the vehicle having a support, a plurality of members, a plurality of moveable wheels and a controller, each wheel coupled to a member, each member moveable about a common axis fixed with respect to the support, the method comprising the following steps:

sensing a current vehicle footprint;

calculating a new vehicle footprint; and moving the members about the common axis to reconfigure the current vehicle footprint to the new vehicle footprint.

27. A method of improving the efficiency of a vehicle by changing the transmission ratio of the vehicle, the vehicle having a support, a plurality of members, a plurality of moveable wheels and a controller each wheel coupled to a member, each member moveable about a common axis fixed with respect to the support, the method comprising the following steps:

sensing a current vehicle footprint;

calculating a new vehicle footprint; and moving the members about the commons axis to reconfigure the current vehicle footprint to the new vehicle footprint.

* * * * *

UNITED STATES PATENT AND TRADEMARK OFFICE
CERTIFICATE OF CORRECTION

PATENT NO. : 5,927,423
DATED : July 27, 1999
INVENTOR(S) : Wada et al.

It is certified that error appears in the above-identified patent and that said Letters Patent is hereby corrected as shown below:

Col. 12, line 21 change "common located" to --common axis located --

Col. 13, line 3, change "axis with" to -- axis fixed with --
Col. 14, line 9, change controller each" to -- controller, each --
Col. 14, line 15, change "commons" to -- common --

Signed and Sealed this

Seventh Day of March, 2000

Attest:

Attesting Officer

Q. TODD DICKINSON

Commissioner of Patents and Trademarks